(12) United States Patent
Son et al.

(10) Patent No.: US 9,239,642 B2
(45) Date of Patent: Jan. 19, 2016

(54) IMAGING APPARATUS AND METHOD OF CONTROLLING THE SAME

(71) Applicant: Samsung Electronics Co., Ltd, Suwon-si, Gyeonggi-do (KR)

(72) Inventors: Woo-ram Son, Seoul (KR); Il-kwon Park, Anyang-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/044,060

(22) Filed: Oct. 2, 2013

(65) Prior Publication Data

US 2014/0306900 A1    Oct. 16, 2014

(30) Foreign Application Priority Data

Apr. 15, 2013  (KR) .......................... 10-2013-0041006

(51) Int. Cl.
*G06F 3/041* (2006.01)

(52) U.S. Cl.
CPC ...................................... *G06F 3/041* (2013.01)

(58) Field of Classification Search
CPC ..... G06F 3/011; G06F 3/0425; G06F 3/0428; G06F 3/1431
USPC ................... 345/1.1–1.3, 173–179; 178/18.01–18.09; 715/841, 863; 455/566; 362/601, 606–607, 612–627; 349/62–65, 69
See application file for complete search history.

(56) References Cited

U.S. PATENT DOCUMENTS

| | | | |
|---|---|---|---|
| 2003/0184528 A1 | 10/2003 | Kawasaki et al. | |
| 2005/0089212 A1* | 4/2005 | Mashitani et al. | 382/154 |
| 2006/0140621 A1* | 6/2006 | Misawa | 396/374 |
| 2008/0119731 A1* | 5/2008 | Becerra et al. | 600/437 |
| 2009/0019401 A1* | 1/2009 | Park et al. | 715/841 |
| 2010/0166404 A1* | 7/2010 | Lombardi | 396/89 |
| 2010/0277421 A1* | 11/2010 | Charlier et al. | 345/173 |
| 2010/0277439 A1* | 11/2010 | Charlier et al. | 345/176 |
| 2011/0163986 A1* | 7/2011 | Lee et al. | 345/173 |
| 2011/0175830 A1* | 7/2011 | Miyazawa et al. | 345/173 |
| 2011/0279223 A1* | 11/2011 | Hatambeiki et al. | 340/4.3 |
| 2012/0019434 A1 | 1/2012 | Kuhlman et al. | |
| 2012/0256823 A1 | 10/2012 | Lee et al. | |
| 2012/0256854 A1 | 10/2012 | Lee et al. | |
| 2012/0256886 A1 | 10/2012 | Ryu et al. | |

FOREIGN PATENT DOCUMENTS

| | | |
|---|---|---|
| JP | 2009139427 | 6/2009 |
| KR | 20100117053 | 11/2010 |
| KR | 20110081040 | 7/2011 |
| KR | 20110120858 | 11/2011 |
| WO | 2011083975 | 7/2011 |
| WO | 2012147522 | 11/2012 |

* cited by examiner

*Primary Examiner* — Saiful A Siddiqui
(74) *Attorney, Agent, or Firm* — Staas & Halsey LLP

(57) ABSTRACT

An imaging apparatus includes an imaging unit configured to perform imaging on a subject, a transparent display configured to display a live-view of the imaging unit and an imaging-related menu in a direction of a user, a sensor configured to sense a touch with respect to two sides of the transparent display, and a controller configured to perform an operation corresponding to the imaging-related menu, when the imaging-related menu is selected by a touch input on a side of the transparent display corresponding to a direction of a subject.

14 Claims, 17 Drawing Sheets

IMAGING APPARATUS AND METHOD OF CONTROLLING THE SAME

CROSS-REFERENCE TO RELATED APPLICATIONS

This application claims priority under 35 U.S.C. §119(a) from Korean Patent Application No. 10-2013-0041006, filed on Apr. 15, 2013, in the Korean Intellectual Property Office, the disclosure of which is incorporated herein by reference in its entirety.

BACKGROUND OF THE INVENTION

1. Field of the Invention

Apparatuses and methods consistent with exemplary embodiments of the present general inventive concept relate to an imaging apparatus and a method of controlling the same, and more particularly, to an imaging apparatus which control an imaging-related operation on a transparent display and a method of controlling the same.

2. Description of the Related Art

Imaging apparatuses recently released mostly include a touch screen for convenience of a user. The imaging apparatuses support several modes to take an optimum picture under various environments.

In general, the imaging apparatuses display a live-view image on a touch screen. The user controls an imaging-related operation by setting a focus region through a touch on a screen or applying an imaging signal while checking a displayed live-view image.

The image apparatuses are generally implemented to display various imaging-related menus on a screen, and to perform a function corresponding to a selected imaging-related menu when the user selects the imaging-related menu.

However, as functions of the imaging apparatuses are increasingly diversified, and sizes thereof are reduced, inconvenience in a user's operation through the screen may be caused.

Therefore, there is a need for an interaction method of simply operating a function of an imaging apparatus with more convenience.

SUMMARY OF THE INVENTION

One or more exemplary embodiments of the present general inventive concept provide an imaging apparatus capable of providing a convenient operation using a transparent display and a method of controlling the same.

Additional features and utilities of the present general inventive concept will be set forth in part in the description which follows and, in part, will be obvious from the description, or may be learned by practice of the general inventive concept.

Exemplary embodiments of the present general inventive concept provide an imaging apparatus, including an imaging unit to image a subject, a transparent display to display a live-view of the imaging unit and an imaging-related menu in a direction of a user, a sensor to sense a touch with respect to two sides of the transparent display, and a controller to perform an operation corresponding to the imaging-related menu, when the imaging-related menu is selected by a touch input on a side of the transparent display corresponding to a direction of a subject.

The imaging apparatus may further include a flip button to change a touch sensing direction, the controller controlling the sensor to toggle which of the two sides of the transparent display receives the touch input, whenever the flip button is selected.

The flip button may be at least one of a physical external button and a soft key displayed in any one side of the transparent display.

The imaging-related menu may include an imaging button which is selected with the touch input on the side of the transparent display in the direction of the subject. The controller may perform imaging on the subject to obtain an image of the subject and store the imaged image in a storage unit when the imaging button is selected.

The imaging-related menu may include a first menu selected by a touch gesture with respect to a first side of the two sides of the transparent display, and a second menu selected by a touch gesture with respect to a second side of the two sides of the transparent display.

The first menu may include at least one of a focus adjustment button and a special effect setting button, and the second menu may include an imaging button.

The imaging unit may include two cameras disposed on the same side of the imaging apparatus and configured to image a three-dimensional (3D) image. The first menu may include a parallax adjustment button, and the second menu may include a focus adjustment button.

The imaging-related menu may have a cylindrical shape, and be displayed in a rotating form. The controller may rotate the imaging-related menu in a first direction when the side of the transparent display in the direction of the user is touched, and rotate the imaging-related menu in a second direction when the side of the transparent display in the direction of the subject is touched.

The controller may display a pre-stored image when a reproduction mode is selected, sequentially change and display the pre-stored image in image units when the side of the transparent display in the direction of the user is touched, and sequentially change and display the pre-stored image in preset image unit groups when the side of the transparent display in the direction of the subject is touched.

Exemplary embodiments of the present general inventive concept also provide a method of controlling an imaging apparatus including a transparent display. The method may include performing imaging on a subject, displaying a live-view and an imaging-related menu in a direction of a user, sensing a touch with respect to two sides of a transparent display, and performing an operation corresponding to the imaging-related menu when the imaging-related menu is selected by a touch input on a side of the transparent display corresponding to a direction of a subject.

The method may further include toggling which of the two sides of the transparent display receives the touch input, whenever a flip button is selected.

The performing of the operation corresponding to the imaging-related menu may include performing imaging on the subject to obtain an image of the subject and storing the imaged image, when an imaging button is selected with the touch input on the side of the transparent display in the direction of the subject.

The imaging-related information may include a first menu selected by a touch gesture with respect to a first side of the transparent display, and a second menu selected by a touch gesture with respect to a second side of the transparent display.

The first menu may include at least one of a focus adjustment button and a special effect setting button, and the second menu may include an imaging button.

The performing of the imaging may include performing imaging using two cameras configured to image a 3D image. The first menu may include a parallax adjustment button, and the second menu may include a focus adjustment button.

The imaging-related menu may have a cylindrical shape, and be displayed in a rotating form. The performing of an operation corresponding to the imaging-related menu may include rotating the imaging-related menu in a first direction when the side of the transparent display in the direction of the user is touched, and rotating the imaging-related menu in a second direction when the side of the transparent display in the direction of the subject is touched.

The method may further include displaying a pre-stored image when a reproduction mode is selected, sequentially changing and displaying the pre-stored image in image units when the side of the transparent display in the direction of the user is touched, and sequentially changing and displaying the pre-stored image in preset image unit groups when the side of the transparent display in the direction of the subject is touched.

A non-transitory computer-readable recording medium may contain computer-readable codes as a program to execute the method.

Exemplary embodiments of the present general inventive concept also provide an imaging apparatus including a first imaging unit to image an image, a transparent display, and a controller to set which of two sides of the imaging apparatus on which a command input is recognized, and to recognize the command input and perform a corresponding operation.

The command input may be any one of a touch input on the transparent display, a gesture detected by the first imaging unit, and a voice input.

The imaging apparatus may further include a second imaging unit, disposed on a side of the imaging apparatus opposite the first imaging unit.

The controller may set which side of the imaging apparatus on which each of a plurality of command inputs are recognized, and recognize each of the plurality of command inputs and perform a command operation.

At least one of the plurality of command inputs may be recognized by an input on both of the two sides of the imaging apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
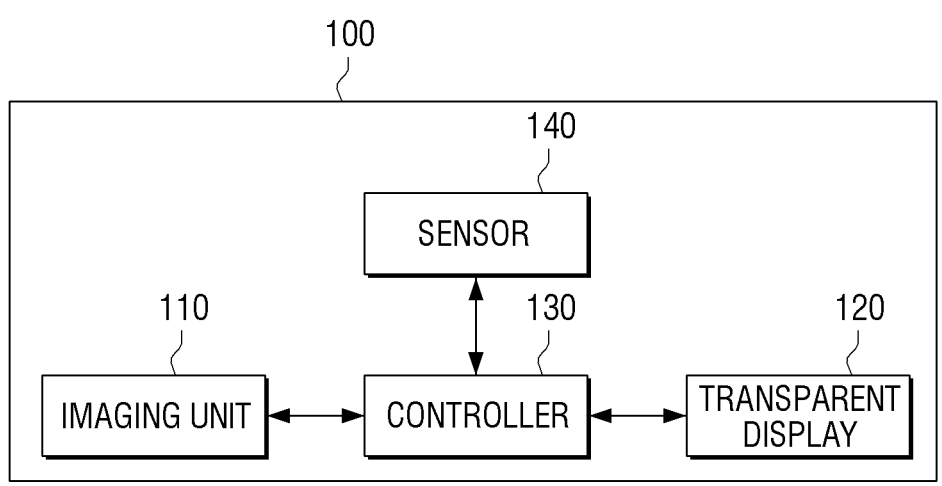
FIG. 1 is a block diagram illustrating an imaging apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the exemplary embodiments of the present general inventive concept. Thus, it is apparent that the exemplary embodiments of the present general inventive concept can be carried out without those specifically defined matters. Also, functions or elements known in the related art are not described in detail since they would obscure the exemplary embodiments with unnecessary detail.

FIG. 1 is a block diagram illustrating an imaging apparatus 100 according to an exemplary embodiment of the present general inventive concept.

An imaging apparatus 100 according to the present general inventive concept performs imaging, or obtaining an image. For the purposes of the exemplary embodiments of the present general inventive concept described herein, "imaging" may include for example capturing an image with a camera, capturing and storing an image, or retrieving a stored image. Therefore, an imaged image may be an image which has been captured, captured and stored, or obtained from storage.

Referring to FIG. 1, the imaging apparatus 100 according to the present general inventive concept may include an imaging unit 110, a transparent display 120, a controller 130, and a sensor 140.

The imaging unit 110 collects light input through a lens and senses an image. The imaging unit 110 includes a lens module including the lens and an image sensor (not illustrated). To focus, the lens may move back and forth in a certain range on an axis arranged in a straight line with the image sensor. An axis in a straight line between the lens and the image sensor may be referred to as an optical axis. To focus, the lens may be adjusted through movement of the lens module or movement of a lens unit combined with a barrel (not illustrated). The focus may be manually adjusted by a user. The image generated by the imaging unit may include a preview image.

The transparent display 120 may be formed of a transparent material, such that objects external to the imaging apparatus 100 may be visible through the transparent display 120. For the purposes of the exemplary embodiments of the present general inventive concept described herein, "transparent" is defined as being significantly or completely transparent, i.e. visible light may pass through unimpeded. The transparent display 120 described in the exemplary embodiments of the present general inventive concept may be formed to be transparent at all times, regardless of an operational state of the imaging apparatus 100. Alternatively, the transparent display 120 may be configured to only be transparent when power is supplied to the transparent display 120.

The transparent display 120 may display the image generated by the imaging unit 110 and an imaging-related menu. The transparent display 120 may be implemented as a touch display panel which may recognize a user operation using a proximity sensor or a touch sensor. Therefore, the transparent display may receive at least one touch gesture through a user's body (for example, fingers including a thumb) or a sensible input device (for example, a stylus pen). Further, the touch panel may be provided in a front side and a rear side of the transparent display 120, to recognize a touch input of the user in both sides thereof.

For convenience of description, the front side of the transparent display 120 is defined as a direction towards the user, and the rear side thereof is defined as a direction towards a subject. However, the directions of the front and rear sides are not unconditional concepts and may be defined as opposites. Alternatively, the front and rear sides may be referred to as first and second sides, and vice versa.

A touch gesture may be defined as an operation which directly touches a screen of the transparent display 120 and inputs a command to an imaging apparatus 100, and may include for example one touch and two touch gestures. A type of one touch gesture may include Tap, Touch & Hold, Double Tap, Drag, Drag & Drop, Flick, and the like. The type of two touch gesture may include Two finger Tap, Touch & Spread, Pinch Out, Pinch In, Two finger Drag, Cross Two finger, Touch & Rotate, and the like. An operation corresponding to the type of touch gesture described herein is merely exemplary, and the imaging apparatus 100 may allow various types of touch gestures to correspond to performance operations.

When a touch gesture of the user is input to the transparent display 120, the controller 130 may recognize the touch gesture as a selection command for the imaging-related menu displayed in a region to which the touch gesture is input, and perform an operation corresponding to the selected imaging-related menu. The imaging-related menu may include, for example, imaging, auto focus (AF), auto exposure (AE), shutter speed, an aperture value, International Standards Organization (ISO) speed, an exposure value (EV), special effect selection, a preset imaging mode (for example, a macro mode, a night mode, a portrait mode, a landscape mode, a sports mode, and the like), and the like. The imaging-related menu may be displayed in the transparent display 120 for example as a table type, an icon type, or a button type menu. Further, the imaging-related menu may include a setting state for a touch on a front and a rear side of the transparent display 120, other than the above-described types. For example, the controller 130 may be set to recognize the touch on the front side of the transparent display 120 as an AF setting and the touch on the rear side of the transparent display 120 as image imaging. Therefore, the controller 130 may perform AF on the basis of a touch region when the touch gesture with respect to the front side of the transparent display 120 is recognized, and perform image imaging when the touch gesture with respect to the rear side is recognized.

The sensor 140 senses a touch input on the transparent display 120. The transparent display 120 may receive a user touch with respect to the front side and rear side, or the first side and the second side thereof. The sensor 140 senses a touch with respect to a side and a region of the transparent display 120. In some cases, the sensor 140 may additionally sense touch pressure and touch time.

Although not illustrated in FIG. 1, the imaging apparatus 100 may include an image processor. The image processor may include a display processor (not illustrated), a frame buffer (not illustrated), and a display driver (not illustrated).

The display processor performs signal processing according to control of the controller 130 to generate screen data. The display processor may include an operation unit (not illustrated) and a rendering unit (not illustrated). The operation unit calculates attribute values such as coordinate values, in which the objects are displayed according to preset layout, shapes, sizes, and colors. The rendering unit generates screen data having various layouts including the objects based on the attribute values calculated in the operation unit. The screen data generated in the display processor may be stored in the frame buffer. For example, the screen data may be generated and stored in a bitmap image form.

The display driver may convert the screen data stored in the frame buffer into an image source signal and apply the image source signal to a transparent display layer. The image source signal includes a scan signal and a driving signal applied to electrodes (not illustrated) connected to each of cells (not illustrated) constituting the transparent display layer. Therefore, the transparent display layer may display a screen.

The transparent display 120 may be implemented in various types according to exemplary embodiments of the present general inventive concept. Specifically, the transparent display 120 may be implemented for example as one of a transparent liquid crystal display (LCD) type, a transparent thin-film transistor electroluminescent panel (TFEL) type, a transparent organic light emitting device (OLED) type, a projection type, and the like.

The transparent LCD type may be referred to as a transparent display apparatus implemented by removing a backlight unit from a currently used LCD apparatus, and using a pair of polarizing plates, an optical film, a transparent thin film transistor (TFT), a transparent electrode, and the like to form the display. In the transparent LCD apparatus, a transparency is reduced due to the polarizing plates or the optical film and an optical efficiency is reduced due to use of ambient light instead of a backlight unit. However, the transparent LCD apparatus may implement a large-scale transparent display.

The transparent TFEL type may be referred to as an apparatus which uses an alternating current (AC) inorganic TFEL display (AC-TFEL) including a transparent electrode, an inorganic phosphor, and an insulating layer. The AC-TFEL type is a display configured to excite a phosphor to emit light through passing of electrons accelerated in the inside of the inorganic phosphor. When the transparent display 120 is implemented as the transparent TFEL type, the controller 130 may adjust electrons to project to an appropriate location and determine an information display location. Since the organic phosphor and the insulating layer have transparent characteristic, a display with more transparency may be implemented.

Further, the transparent OLED type may be referred to as a transparent display apparatus using self-emissible OLED. Since an organic light-emitting layer in the OLED is transparent, when a transparent electrode is used as both electrodes in the OLED, the OLED may be implemented with a transparent display apparatus. The OLED emits light by injecting electrons and holes from either side of the organic light-emitting layer and by recombining the electrons and holes in the organic light-emitting layer. The transparent OLED apparatus displays information by injecting electrons and holes into a desired location using the principle.

Figure 2:
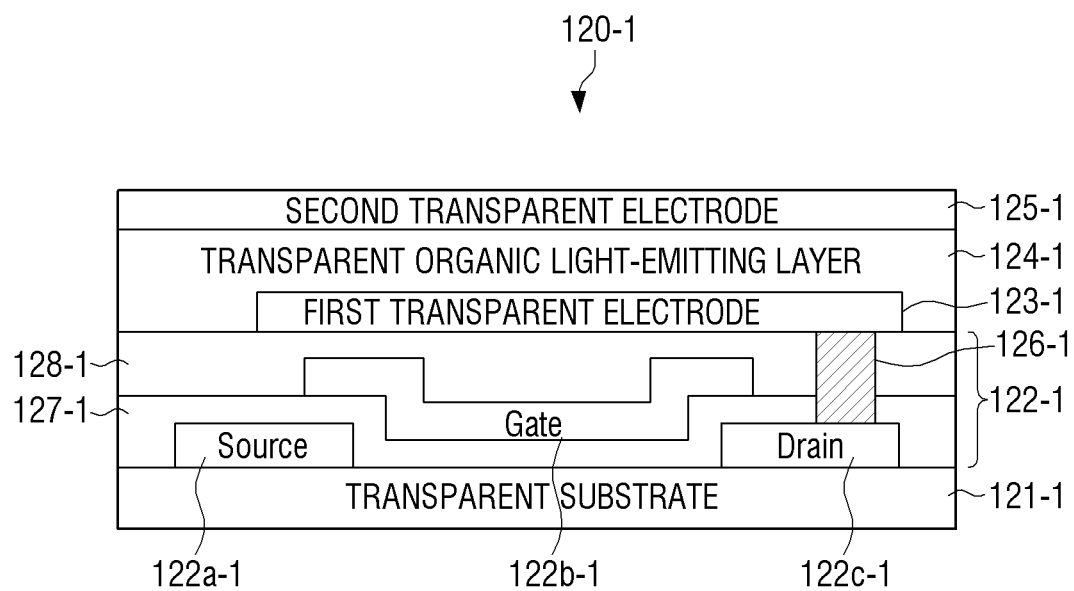
FIG. 2 is a view illustrating an example of a detailed configuration of a transparent display panel according to an exemplary embodiment of the present general inventive concept.

FIG. 2 is a view illustrating an example of a detailed configuration of a transparent display panel 120-1 implemented with the transparent OLED type. Such a transparent display panel 120-1 is suitable for use as the transparent display 120 illustrated in FIG. 1

Referring to FIG. 2, the transparent display panel 120-1 includes a transparent substrate 121-1, a transparent transistor layer 122-1, and a first transparent electrode 123-1. A transparent organic light-emitting layer 124-1, a second transparent electrode 125-1, a connection electrode 126-1, and dielectric layers 127-1 and 128-1.

The transparent substrate 121-1 may use a glass or a polymer material such as plastic having a transparent property. Although only one transparent substrate 121-1 is illustrated for simplicity of illustration, it will be understood that the transparent display 120 of the imaging apparatus 100 includes two such transparent substrates 121-1. One transparent substrate 121-1 is disposed as illustrated in FIG. 2, and a second transparent substrate 121-1 is disposed over the second transparent electrode 125-1, such that that second transparent electrode 125-1, transparent organic light-emitting layer 124-1, first transparent electrode 123-1, and transparent transistor 122-1 are disposed between the two transparent substrates 121-1. In this way, the two transparent substrates 121-1 form the front side and the rear side of the transparent display 120, and may receive touch gestures.

The transparent transistor layer 122-1 may be referred to as a layer including a transistor fabricated by replacing opaque silicon of an existing TFT with a transparent material such as transparent zinc oxide, or transparent titanium oxide. A source 122a-1, gate 122b-1, drain 122c-1, and various dielectric layers 127-1 and 128-1 may be provided in the transparent transistor layer 122-1, and the connection electrode 126-1 configured to electrically connect the drain and the first transparent electrode 123-1 may be provided in the transparent transistor layer 122-1. Although not illustrated, the second transparent electrode 125-1 is connected to the first transparent electrode 123-1, such that the second transparent electrode 125-1 and the first transparent electrode 123-1 may both be controlled by the transparent transistor layer 122-1.

FIG. 2 illustrates only one transparent transistor including the source 122a-1, gate 122b-1, and drain 122c-1 in the transparent transistor layer 122-1. However, substantially, a plurality of transistors uniformly distributed in an entire region of a display surface may be provided. The controller 130 may apply a control signal to a gate of each of the transistors in the transparent transistor layer 122-1, and drive a corresponding transparent transistor to display information.

The first transparent electrode 123-1 and the second transparent electrode 125-1 are disposed on opposite sides of the transparent organic light-emitting layer 124-1. The first transparent electrode 123-1, the transparent organic light-emitting layer 124-1, and the second transparent electrode 125-1 form a transparent organic light-emitting diode.

The transparent organic light-emitting diode is divided into a passive matrix OLED (PMOLED) and an active matrix OLED (AMOLED) according to a driving manner. The PMOLED has a structure that pixels are formed in intersections of the first and second transparent electrodes 123-1 and 125-1. The AMPLED has a structure including TFTs configured to pixels. FIG. 2 illustrates the AMOLED. Each of the first transparent electrode 123-1 and the second transparent electrode 125-1 includes a plurality of line electrodes, and an alignment direction of the line electrodes in the first transparent electrode 123-1 is formed perpendicular to that of the line electrodes in the second transparent electrode 125-1. As illustrated in FIG. 2, the line electrodes of the second transparent electrode 125-1 are arranged in a direction extending left to right, such that the length of the line electrodes of the second transparent electrode 125-1 is illustrated in FIG. 2. Furthermore, the line electrodes of the first transparent electrode 123-1 are arranged in a direction perpendicular to the line electrodes of the second transparent electrode 125-1, such that the width of the line electrodes of the first transparent electrode 123-1 is illustrated in FIG. 2. Therefore, a plurality of intersection regions are formed between the first transparent electrode 123-1 and the second transparent electrode 125-1. The transparent transistor as illustrated in FIG. 2 is connected to each of the intersection regions.

The controller 130 allows potential differences according to the intersection regions to be formed using the transparent transistors. Electrons and holes are injected to the transparent organic light-emitting layer 124-1 from the electrodes in the intersection regions in which the potential difference is formed, and recombined to emit light. Light is not emitted in the intersection region in which the potential difference is not formed, and thus a rear background is transparently displayed as it is.

The first and second transparent electrodes 123-1 and 125-1 may include indium tin oxide. Alternatively, the first and second transparent electrodes 123-1 and 125-1 may include a new material such as graphene. Graphene may be referred to as a material has a structure in which carbons atoms are connected to form a honey comb-shaped plane, and has a transparent property. Further, the transparent organic light-emitting layer may be implemented with various materials.

As described above, the transparent display 120 may be implemented in a transparent LCD type, a transparent TFEL type, a transparent OLED type, and the like. However, the transparent display 120 may be implemented in a projection type. The projection type may be referred to as a method of projecting and displaying an image to a transparent screen. For example, a system such as a heads up display (HUD) corresponds to a projection type system.

One transparent display panel 120-1 is illustrated in FIG. 2, but the transparent display 120 may be implemented using a plurality of transparent display panels 120-1.

Figure 3:
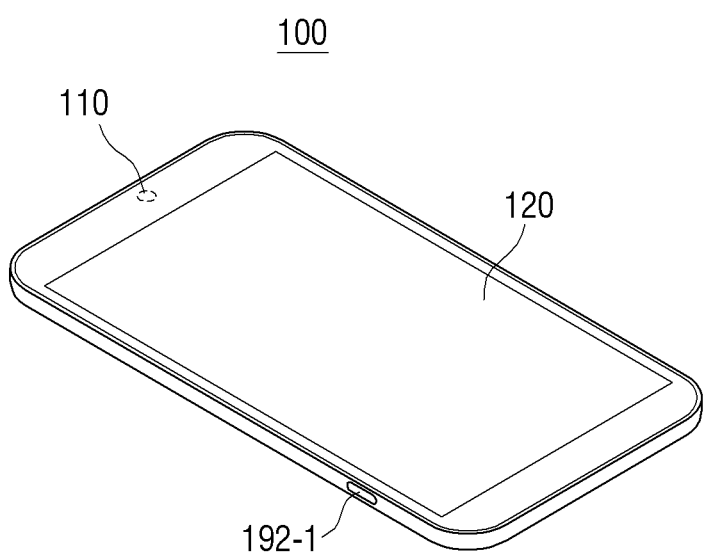
FIG. 3 is a perspective view illustrating an imaging apparatus according to an exemplary embodiment of the present general inventive concept.

FIG. 3 is a perspective view of an imaging apparatus 100 according to an exemplary embodiment of the present general inventive concept.

Referring to FIG. 3, the imaging apparatus 100 includes an imaging unit 110, a transparent display 120, and a flip button 192-1. For convenience of description, a side of the imaging apparatus 100 in which an imaging unit 110 is disposed is called the rear side. However, the front side and the rear side are not necessarily arranged in this manner. Depending on the exemplary embodiment of the present general inventive concept, the front and rear sides of the imaging apparatus 100 may be disposed on opposite sides than are illustrated in FIG. 3.

The imaging apparatus 100 include the transparent display 120. As described above, since the transparent display 120 may be formed of a transparent material, the user may view an opposite side through the transparent display 120.

The imaging unit 110 may be disposed in an appropriate location of the imaging apparatus 100 according to the exemplary embodiment of the present general inventive concept. In the exemplary embodiment illustrated in FIG. 3, the imaging unit 110 is disposed in a top of the rear side. Selectively, the imaging apparatus 100 may include an input unit (not illustrated) in a bottom of the front side, to receive user input. The input unit may include buttons such as home, cancel, and call. The input unit may be implemented in a physical button type or in a touch type.

The flip button 192-1 may be included in one lateral side of the imaging apparatus 100. The flip button 192-1 may switch a recognition surface of a touch gesture for the imaging-related menu. For example, it is assumed that the transparent display 120 displays only an imaging button. The imaging apparatus 100 may set that a touch gesture of the user input from the rear side of the transparent display 120 is recognized as a selection command of the imaging button. At this time, even when the user inputs a touch gesture with respect to the front side of the transparent display 120, the imaging apparatus 100 does not perform an imaging command.

However, when the user inputs a flip command using the flip button 192-1, the imaging apparatus 100 recognizes the touch gesture with respect to the front side of the transparent display as a selection command of the imaging button. At this time, the imaging apparatus 100 does not recognize a user's touch gesture with respect to the rear side. Although FIG. 3 illustrates that the flip button 192-1 is implemented in a physical key form outside the transparent display 120, the flip button 192-1 may be implemented in a soft key form in one region of the transparent display 120. Alternatively, the flip button 192-1 may be implemented both in the physical key form and in the soft key form.

The flip button 192-1 may also switch a left and right direction of an imaged image.

The user may image an image conveniently using the imaging apparatus 100 including the transparent display 120.

Figure 4:
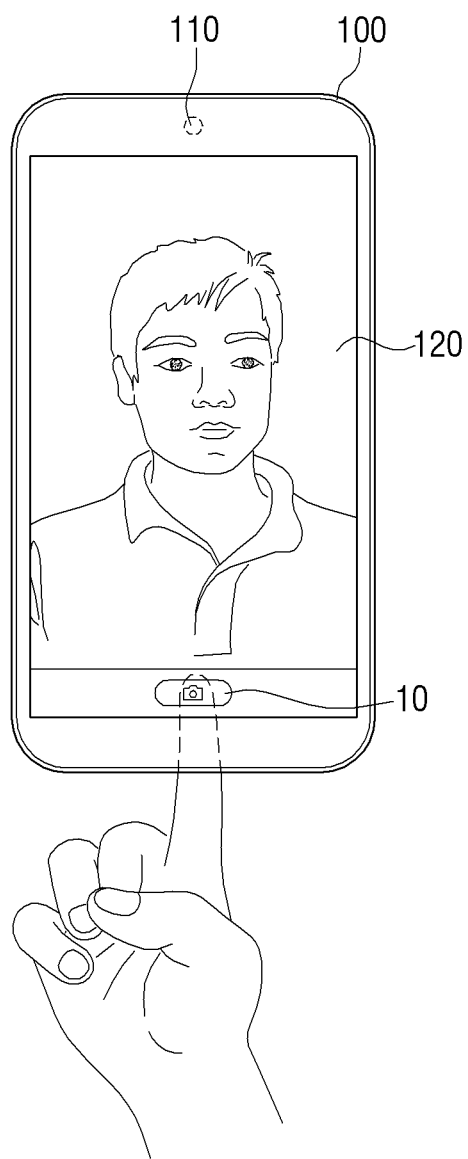
FIG. 4 is a view explaining an imaging process according to an exemplary embodiment of the present general inventive concept.

FIG. 4 is a view illustrating an imaging process according to an exemplary embodiment of the present general inventive concept.

Referring to FIG. 4, the imaging unit 110 images a subject. The imaged subject is displayed in the transparent display 120. In this exemplary embodiment of the present general inventive concept, displaying the imaged subject means displaying the subject in a preview image on the transparent display 120.

An imaging button 10 may be displayed in one region of the transparent display 120. The imaging apparatus 100 may set so that a selection command of the imaging button 10 is input when a touch gesture with respect to the rear side of the transparent display 120 is recognized. While the user checks the subject displayed in front side of the transparent display 120, the user touches the rear side of the transparent display 120 in which the image button 10 is displayed. As described above, since the transparent display 120 is transparent, the user may view a subject disposed on an opposite side of the imaging unit 100 through the transparent display 120. Therefore, the user images the subject conveniently, and the imaging apparatus 100 stores the imaged image in a storage unit (not illustrated) when an imaging command is recognized.

The imaging apparatus 100 may set the flip button 192-1 to switch a recognition surface of the imaging button 10, and the imaging apparatus 100 may switch the recognition surface of the imaging button 10 to the front side of the transparent display 120 from the rear side thereof when the user selects the flip button 192-1.

Although FIG. 4 illustrates a general imaging processing, self-imaging may also be performed conveniently. For the self-imaging, the user faces the rear side of the transparent display 120 in which the imaging unit 110 is disposed. Therefore, when the imaging unit 110 images the user, the imaging apparatus 100 displays the imaged user in the transparent display 120. At this time, since the image is displayed on a front side of the transparent display and the user is viewing a rear side, the image viewed by the user through the transparent display 120 is displayed in a state in which a left and right direction is switched. Further, the imaging apparatus 100 recognizes a touch gesture with respect to the side in which the user is located as a selection command of the imaging button 10. The imaging apparatus 100 may set the flip button as a setting of a self-imaging mode. At this time, when the user selects the flip button, inversion of the left and right of the image and switching of the recognition surface of the imaging button 10 may be simultaneously performed. Alternatively, the imaging apparatus 100 may display a separate self-imaging menu in the transparent display 120, and may change a setting state of the imaging apparatus 100 to be suitable for the self-imaging by selection of the user.

The imaging apparatus 100 may include an imaging unit 110 including one camera, and the user may directly check his/her own image displayed in the transparent display 120. Since the user selects the imaging button 10 on one side of the transparent display 120 while viewing an opposite side of the transparent display 120, the user performs the self-imaging conveniently, without the user's hand obscuring the image.

Although FIG. 4 illustrates an example in which the imaging button 10 is displayed, the imaging apparatus 100 may not display the imaging button 10 in a separate button form. For example, the imaging apparatus 100 may alternatively be set to perform the imaging when a predetermined touch gesture with respect to the front side or the rear side of the transparent display 120 is input.

Until now, the process of performing the imaging as a basic operation of the imaging apparatus 100 has been described. The imaging apparatus 100 may display various imaging-related setting menus to image an optimal image.

Figure 5:
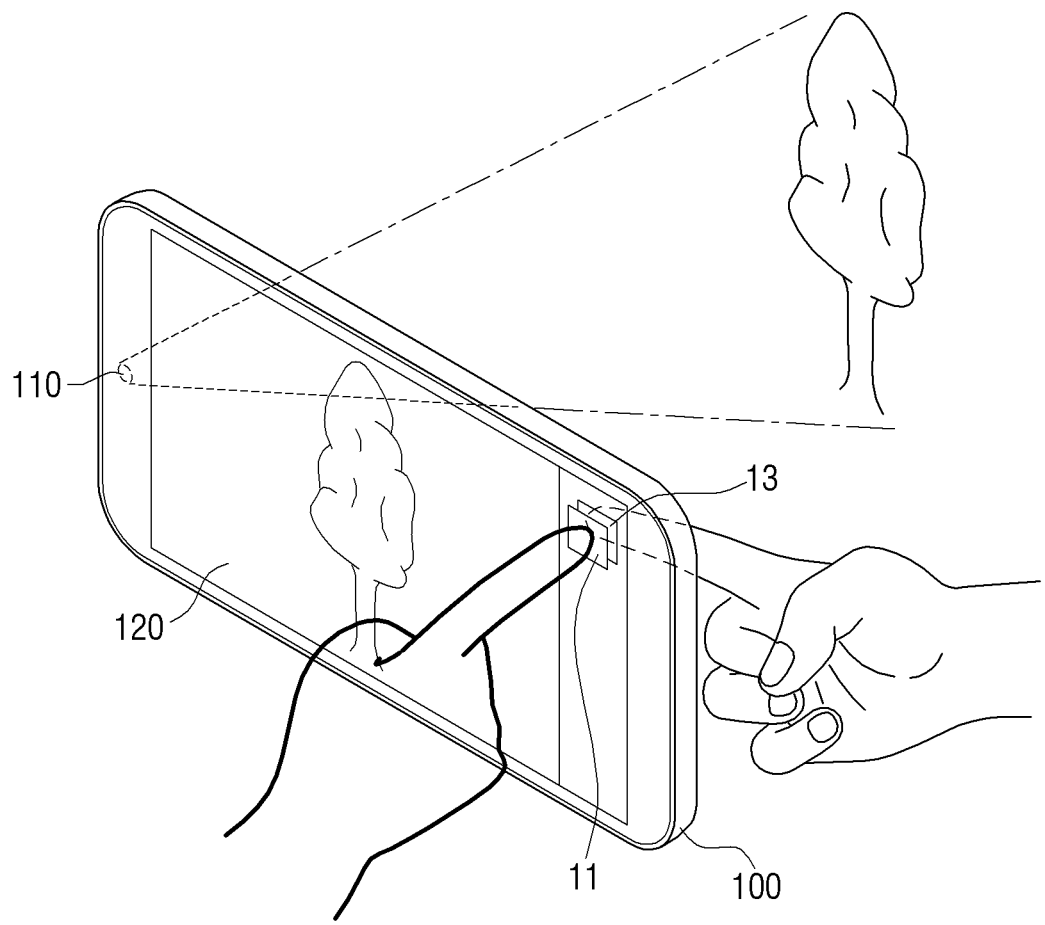
FIG. 5 is a view explaining a menu selection process according to an exemplary embodiment of the present general inventive concept.

FIG. 5 is a view explaining a menu selection process according to an exemplary embodiment of the present general inventive concept.

Referring to FIG. 5, the imaging unit 110 images a subject. The imaged subject is displayed in the transparent display 120. An imaging-related menu may be displayed in one region of the transparent display 120.

The imaging-related menu may include an auto mode, a program mode, a shutter speed priority mode, an aperture value priority mode, a manual mode, a night view mode, a landscape mode, a macro mode, a sports mode, and the like, as an imaging mode. Further, the imaging-related menu may include an AF menu, a side light menu, a flash menu, an ISO setting, EV setting, a white balance setting, a zoom setting, a special effect, and the like.

The imaging-related menu may be displayed in a form in which two menus overlap each other. As illustrated in FIG. 5, a first menu 11 is a menu displayed in the front side of the transparent display 120, and is selected by a touch gesture with respect to the front side of the transparent display 120. A second menu 13 is an overlapping menu displayed on the rear side of the transparent display 120, disposed behind the first menu. The second menu 13 is selected by a touch gesture with respect to the rear side of the transparent display 120. For example, the first menu 11 may be a focus adjustment button, and the second menu 12 may be an imaging button. At this time, the user may select the first menu 11 to adjust a focus, and may select the second menu 13 to perform imaging.

Alternatively, the first menu 11 may be a special effect setting button, and the second menu 13 may be an imaging button. At this time, the user may select the first menu 11 to set a special effect, and select the second menu 13 to perform imaging. The display of the imaging-related menu is merely exemplary, and is not limited to the display illustrated in FIG. 5. For example, the imaging-related menu may be displayed on an imaged image. Further, the first menu 11 and the second menu 13 may be divided and applied according to performance, use, and the like of the imaging apparatus 100.

Various exemplary embodiments of the present general inventive concept related to the imaging-related menu will be described below.

Figure 6:
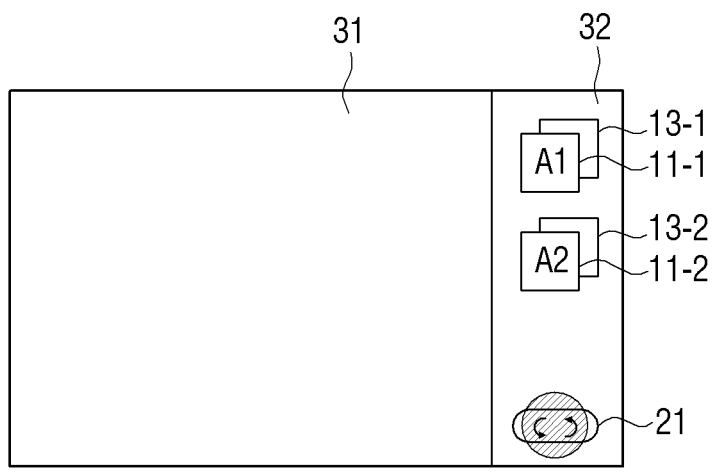
FIGS. 6 and 7 are views explaining menu display methods according to various exemplary embodiments of the present general inventive concept.
Figure 6:
Figure 6:
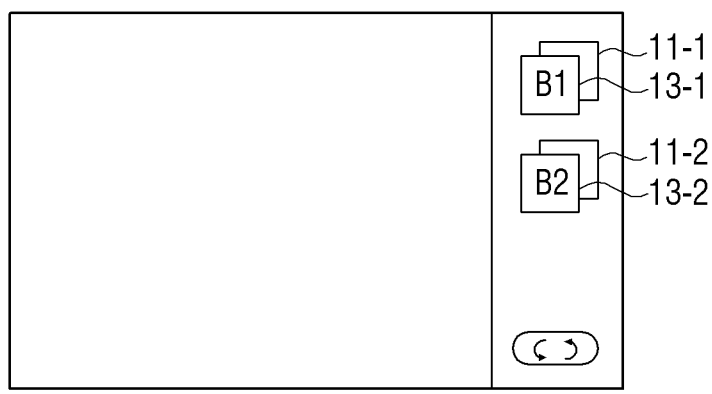
Figure 7:
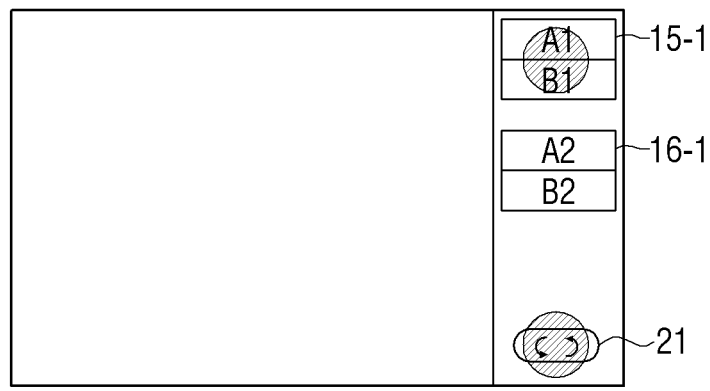
Figure 7:
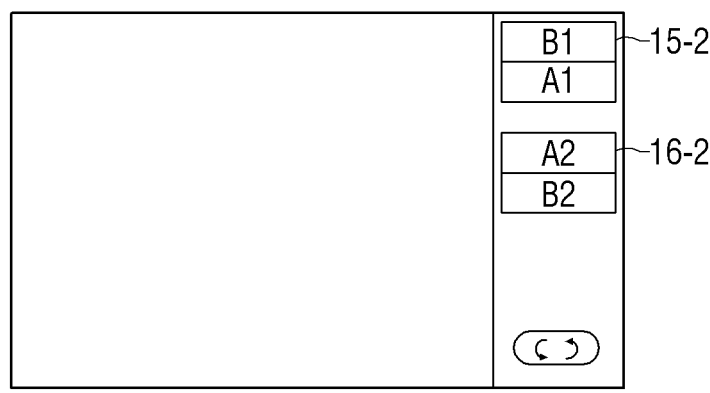

FIGS. 6 and 7 are views explaining menu displays according to various exemplary embodiments of the present general inventive concept.

Referring to FIG. 6, a first region 31 in which an imaged image is displayed and a second region 32 in which an imaging-related menu is displayed may be displayed in a screen 51a of the transparent display 120. Imaging-related menus A1 11-1, A2 11-2, B1 13-1, and B2 13-2 may be displayed in the second region 32 as the imaging-related menu. The menus A1 11-1 and A2 11-2 may be selected with a touch gesture with respect to the front side of the transparent display 120, and the menus B1 13-1 and B2 13-2 may be selected with a touch gesture with respect to the rear side of the transparent display 120. A flip button 21 configured to switch a touch gesture recognition surface of the menus may be displayed in a soft key form in the second region 32. The menus B1 13-1 and B2 13-2 may be displayed in a form to overlap the menus A1 11-1 and A2 11-2.

When the user selects the flip button 21 once, the touch gesture recognition surfaces of the menus B1 13-1 and B2 13-2 and the menus A1 11-1 and A2 11-2 are switched. FIG. 6 illustrates a screen 51b in which the touch gesture recognition surfaces of the menus are switched. That is, the menus B1 13-1 and B2 13-2 is displayed before the menus A1 11-1 and A2 11-2, when viewed from the front side of the transparent display 120. The menus B1 13-1 and B2 13-2 may be selected with the touch gesture with respect to the front side of the transparent display 120, and the menus A1 11-1 and A2 11-2 may be selected with the touch gesture of the rear side thereof.

When the user selects the flip button 21 again, the menus B1 13-1 and B2 13-2 and the menus A1 11-1 and A2 11-2 are switched once again. An example in which the menus A1 11-1 and A2 11-2 and the menus B1 13-1 and B2 13-2 are switched in a group form has been illustrated in FIG. 6.

Referring to FIG. 7, a screen 53a in which menus are displayed in a second region of the transparent display 120 in a form different from that of FIG. 6. A menu 15-1 in which A1 and B1 are displayed above and below and a menu 16-1 in which A2 and B2 are displayed above and below may be displayed in FIG. 7. Similar to FIGS. 6, A1 and A2 may be selected with a touch gesture with respect to the front side of the transparent display 120, and B1 and B2 may be selected with a touch gesture with respect to the rear side thereof. When the menus 15-1, 15-2, 16-1, and 16-2 are displayed in the manner illustrated in FIG. 7, a user can view all the menus and easily discern which menus are respectively operated with touch gestures with respect to the front and rear sides of the transparent display 120.

The user may touch the menu 15-1 in which A1 and B1 are displayed. A tap gesture of the user may be recognized as a command in which A1 may not be executed, and the menu 15-1 including A1 is selected. In a state in which the menu 15-1 including A1 is selected, when the user selects the flip button 21 once, switching of the touch recognition surface may be performed on only the menu 15-1 including A1.

A screen 53b, in which a menu 15-2 in which locations of A1 and B1 are changed and a menu 16-2 including an unchanged A2 and B2 are displayed, is displayed in FIG. 7. That is, the menu 15-1 including A1 is switched for the menu 15-2 in which B1 and A1 are disposed above and below. In contrast, the menu 16-1, which was not selected in the operation described above, is unaffected by the flip button 21, as illustrated by menu 16-2 with A2 disposed above B2. At this time, B1 and A2 may be selected with a touch gesture with respect the front side of the transparent display 120, and A1 and B2 may be selected with a touch gesture of the rear side.

Since the menus 15-1, 16-1, 15-2, and 16-2 are disposed in the same region of the transparent display 120, the imaging apparatus 100 may display many menus, and the user may perform an imaging-related setting conveniently.

Figure 8:
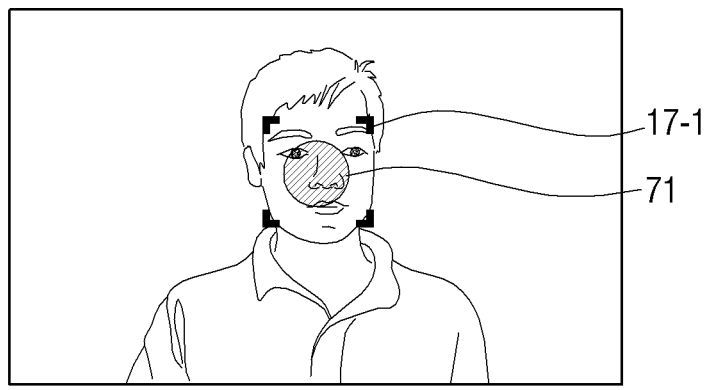
FIGS. 8 and 9 are views explaining an imaging environment setting process according to various exemplary embodiments of the present general inventive concept.
Figure 8:
Figure 8:
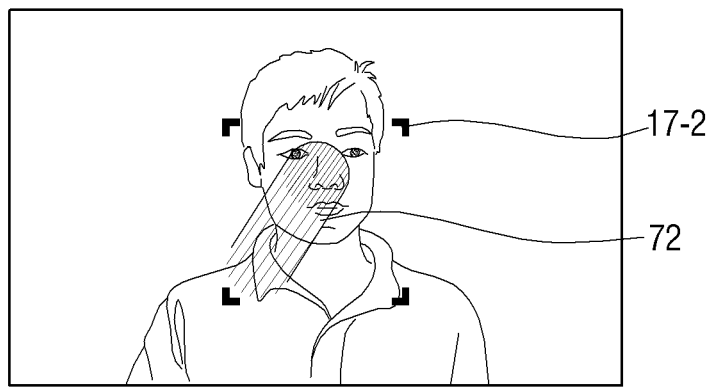
Figure 8:
Figure 8:
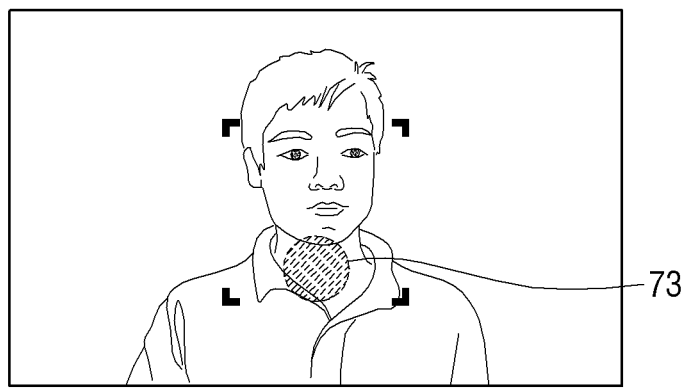
Figure 9:
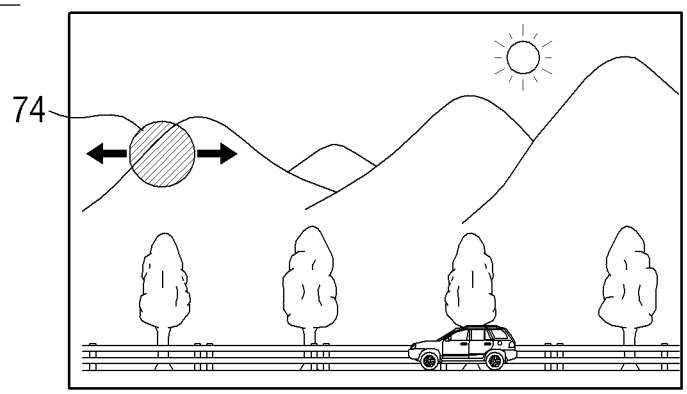
Figure 9:
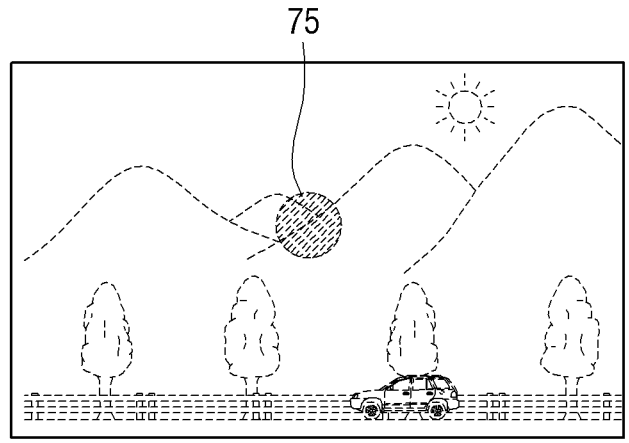

FIGS. 8 and 9 are views illustrating imaging environment setting processes according to various exemplary embodiments of the present general inventive concept.

The imaging apparatus 100 may set an AF mode with respect to a front touch, and set imaging execution with respect to a rear touch. When only one menu corresponds to either side of the transparent display 120, the imaging apparatus 100 may not display a separate menu region or a menu.

When a tap touch gesture 71 of the user with respect to the front side of the transparent display 120 is recognized, the imaging apparatus 100 performs an AF mode corresponding thereto to display a focus region 17-1. FIG. 8 illustrates a screen 55a in which the AF mode is executed by the tap touch gesture 71 of the user.

The imaging apparatus 100 may set a drag touch gesture 72 with respect the front side to correspond to a focus region extension command. When the user inputs the drag touch gesture 72 with respect to the front side, the imaging apparatus 100 extends a focus region 17-2 to correspond to the drag touch gesture 72. FIG. 8 illustrates a screen 55b in which the extended focus region 17-2 is displayed.

The user inputs a tap touch gesture 73 with respect to the rear side of the transparent display 120. FIG. 8 illustrates a screen 55c to which the tap touch gesture 73 with respect to the rear side of the transparent display 120 is input. The imaging apparatus 100 images an image corresponding to the input tap touch gesture 73 and stores the imaged image. The imaging apparatus 100 determines and sets an exposure value with respect to the set focus region 17-2 to image an image. The imaging apparatus 100 may inquire of the user about whether to store the image before the image is stored.

The imaging apparatus 100 may set a special effect setting mode with respect to the front touch and set imaging execution with respect to the rear touch. The special effect may include smudge, blur, lens flare, and the like.

Referring to FIG. 9, a special effect with respect to the touch gesture of the user with respect to the front side of the transparent display 120 is set. For the purposes of this description, the special effect is blurring, but it will be understood that any special effect may be applied. FIG. 9 illustrates a screen 57a to which a touch gesture 74 of the user is input with respect to the front side of the transparent display 120. The imaging apparatus 100 applies the set special effect and the blur effect to an image imaged according to the touch gesture 74 of the user.

FIG. 9 illustrates the screen 57a which displays an imaged image to which the blur effect is applied. The user inputs a tap touch gesture 75 with respect to the rear side of the transparent display 120. The imaging apparatus 100 images an image corresponding to the input tap touch gesture 75 and stores the imaged image, which has the selected special effect applied to it.

The imaging apparatus 100 may display various types of imaging-related menu interfaces to receive imaging-related setting selection or to receive a selection command of the imaging-related menu corresponding to a front touch gesture and a rear touch gesture of the transparent display 120.

Figure 10:
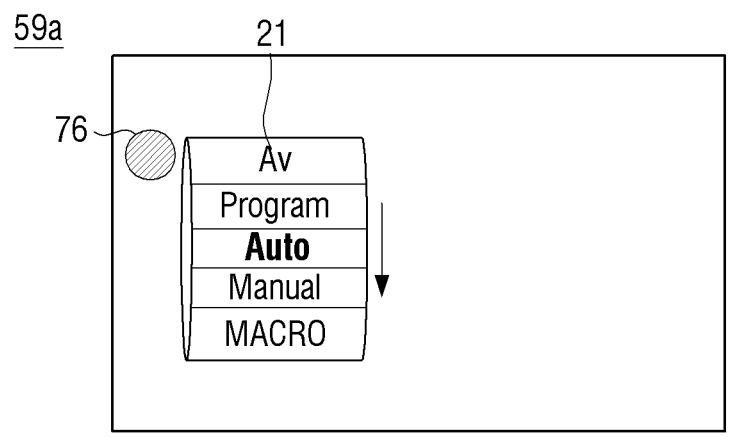
FIGS. 10 and 11 are views illustrating an imaging-related menu user interface (UI) according to various exemplary embodiments of the present general inventive concept.
Figure 10:
Figure 10:
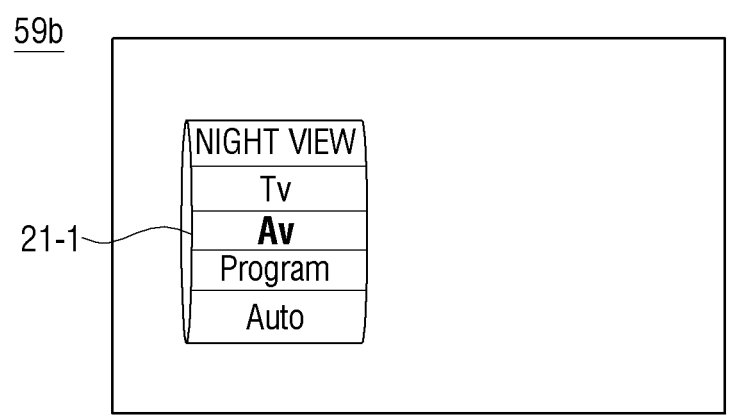
Figure 11:
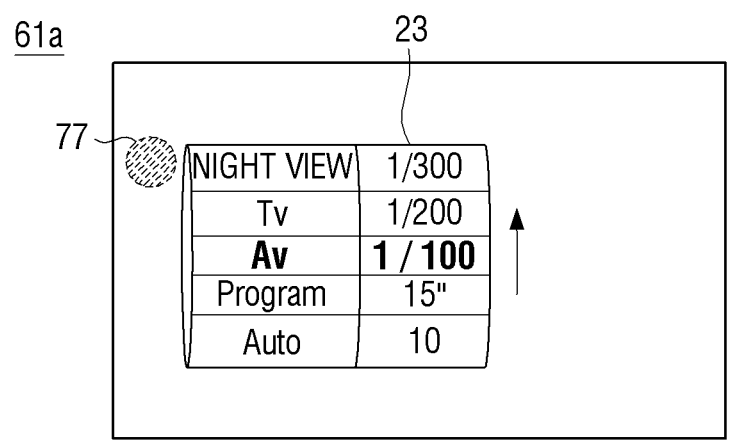
Figure 11:
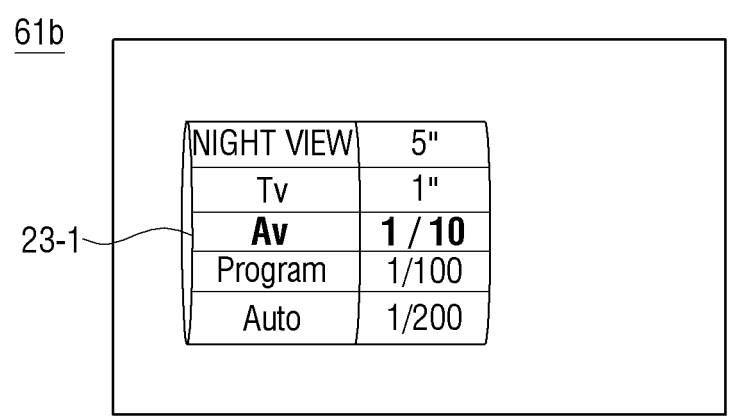

FIGS. 10 and 11 are views explaining imaging-related menu user interfaces (Us) according to various exemplary embodiments of the present general inventive concept.

Referring to FIG. 10, a screen 59a in which a cylindrical-shaped imaging-related menu is displayed is displayed. The imaging-related menu is displayed in a cylindrical shape, and is rotated in a first direction when the touch gesture with respect to the front side of the transparent display 120 is recognized and rotated in a second direction when the touch gesture with respect to the rear side is recognized.

In FIG. 10, an imaging mode is selected, and an image-related menu 21, in which an Auto mode, an aperture value priority (Av) mode, a program mode, a manual mode, and a macro mode, which are kinds of the imaging mode, are displayed, is displayed. When a touch gesture 76 with respect to the front side of the transparent display 120 is input, the image-related menu 21 moves downward one by one. As the imaging-related menu 21 moves downward, the lowermost menu disappears, and another menu is displayed in the uppermost side. In an exemplary embodiment of the present general inventive concept, while the touch gesture 76 is maintained, the imaging-related menu 21 moves in a continuous rotating form. When the input of the touch gesture stops, the rotation of the imaging-related menu 21 also stops.

In FIG. 10, a screen 59b in which the imaging-related menu 21, of which the aperture value priority (AV) mode 21-1 is represented in a center, is represented is displayed. The menu located in the center may be boldly represented to indicate it is the current selection. Alternately, the menu may be represented with a different color. When a certain period of time (for example, 0.5 second, 1 second, or the like) elapses after the stop of the input of the touch gesture, the aperture value priority (Av) mode is automatically set.

In another exemplary embodiment of the present general inventive concept, the mode may not be automatically set, and a mode corresponding to a touched mode region may be set when the user touches the mode region.

The set aperture value priority (Av) mode 21-1 is necessary to set details to determine an aperture open value.

Referring to FIG. 11, a screen 61a, in which an imaging-related menu 23 to select an open value which is a detailed menu of the aperture value priority (Av) mode 21-1 is additionally represented, is displayed. When a touch gesture with respect to the rear side of the transparent display 120 is input, the imaging-related menu 23 moves upward one by one. As the imaging-related menu 23 moves upward, the uppermost menu disappears, and another menu is represented in the lowermost side. When the input of the touch gesture 77 stops, rotation of the imaging-related menu 23 also stops.

In FIG. 11, a screen 61b in which the imaging-related menu 23, in which selection 23-1 of 1/10 second is represented in a center, is displayed. Like in FIG. 10, the selection 23-1 may be boldly represented, and may be automatically set when a certain period of time elapses after the input of the touch gesture stops.

Although the examples in which the imaging-related menu is rotated in a top and bottom direction have been described in FIGS. 10 and 11, the imaging-related menu may be implemented in a rotating form in a left and right direction.

The imaging apparatus 100 may set an imaging-related mode or value to perform imaging through the above-described process. The imaging apparatus 100 may perform imaging many times to store the imaged image. The imaging apparatus 100 may perform different commands according to a touch gesture with respect to the front side or the rear side of the transparent display 120 in a process of reproducing a stored image.

Figure 12:
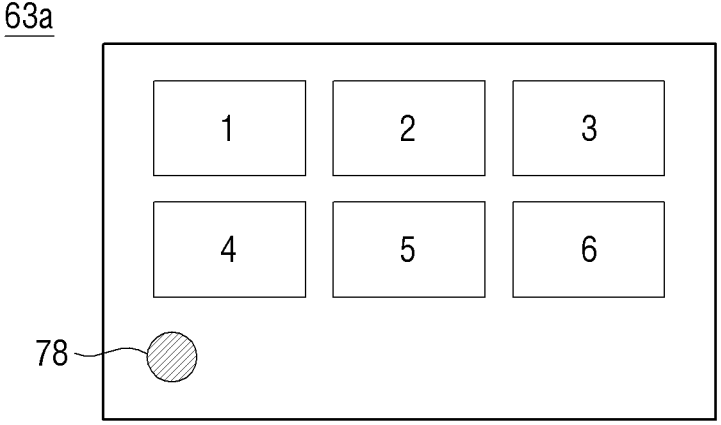
FIGS. 12 and 13 are views illustrating a method of checking an imaged image according to various exemplary embodiments of the present general inventive concept.
Figure 12:
Figure 12:
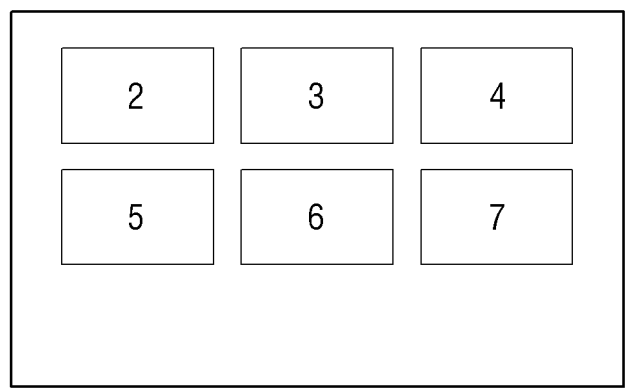
Figure 13:
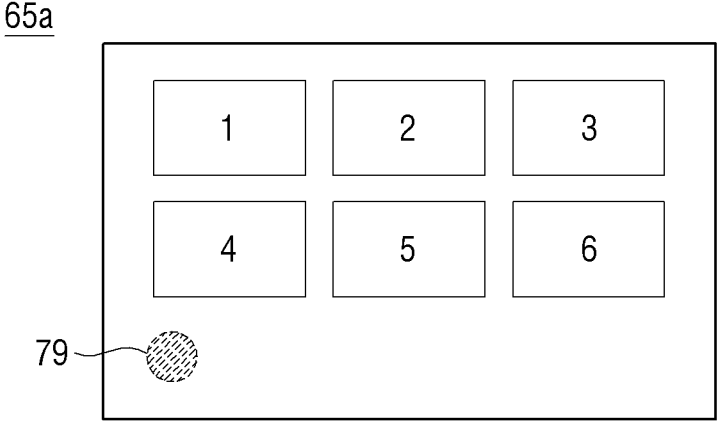
Figure 13:
Figure 13:
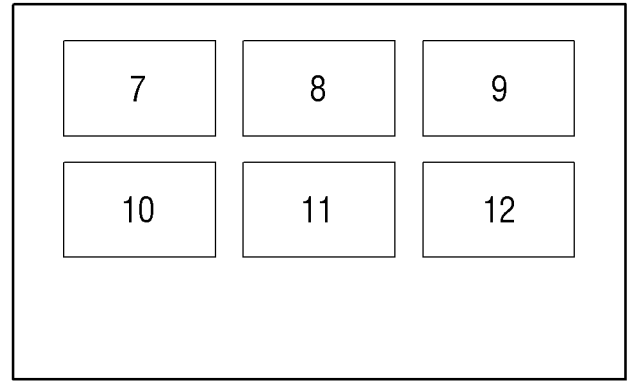

FIGS. 12 and 13 are views explaining methods of checking an imaged image according to various exemplary embodiments of the present general inventive concept.

Referring to FIG. 12, a screen 63a, displaying six images which have been imaged and stored, is illustrated. The number of images displayed in one screen may be variously set according to a size of the transparent display 120, a size of the displayed image, and the like. A touch gesture 78 with respect to the front side of the transparent display 120 is input.

In FIG. 12, a screen 63b is illustrated, in which an operation corresponding to the touch gesture 78 input with respect to the front side of the transparent display 120 is performed. That is, the imaging apparatus 100 may sequentially change and display a pre-stored image in image units according to an input of the touch gesture 78 with respect to the front side of the transparent display 120. For example, a first image, designated by 1 in FIG. 12, may disappear according to one touch gesture 78 with respect to the front side, and second to seventh images 2-7 may be displayed in the transparent display 120, such that six images are still displayed on the screen 63b.

Referring to FIG. 13, a screen 65a displaying six images which have been imaged and stored is illustrated. A touch gesture 79 with respect to the rear side of the transparent display 120 is input.

In FIG. 13, a screen 65b, in which an operation corresponding to a touch gesture 79 input with respect to the rear side of the transparent display 120 is performed, is illustrated. That is, the imaging apparatus 100 may sequentially change and display a preset image unit group according to an input of the touch gesture 79 with respect to the rear side of the transparent display 120. For example, six images 1 to 6 displayed in a first page may disappear according to one touch gesture 79 with respect to the rear side of the transparent display 120, and six new images 7 to 12 corresponding to a next page may be displayed in the transparent display 120.

The exemplary embodiments of the present general inventive concept illustrated in FIGS. 12-13 show image unit groups with six units, corresponding to six images. However, the preset image unit groups may be set as five units, ten units, one unit, and the like, according to the exemplary embodiment or a selection of the user.

Until now, description has been made on the basis of the imaging apparatus 100 in which one camera is included in the imaging unit 110. The imaging apparatus 100 may also image a three-dimensional (3D) image by including a plurality of cameras on the same side.

Figure 14:
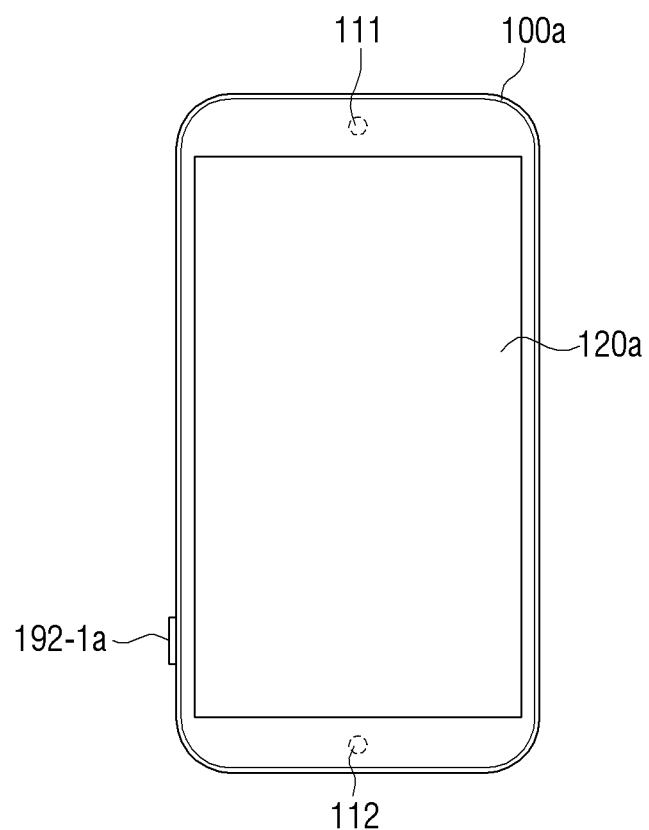
FIG. 14 is a front view of an imaging apparatus according to an another exemplary embodiment of the present general inventive concept.

FIG. 14 is a front view illustrating an imaging apparatus 100a according to another exemplary embodiment of the present general inventive concept.

Referring to FIG. 14, the imaging apparatus 100a may include two cameras 111 and 112, a transparent display 120a, and a flip button 192-1a. The transparent display 120a and flip button 192-1a operate similarly to those illustrated in FIG. 3, and thus detailed description thereof will be omitted.

The two cameras 111 and 112 may be disposed on the same side of the imaging apparatus 100a. The two cameras may be disposed at predetermined intervals on a straight line to image a 3D image. Therefore, a first camera 111 may be disposed in a top center of a rear side of the imaging apparatus 100a, and a second camera 112 may be disposed in a bottom center of the rear side of the imaging apparatus 100a. The arrangement of the first and second cameras 111 and 112 described above and illustrated in FIG. 14 is merely an exemplary embodiment of the present general inventive concept, and the cameras 111 and 112 may be disposed in various locations.

Figure 15:
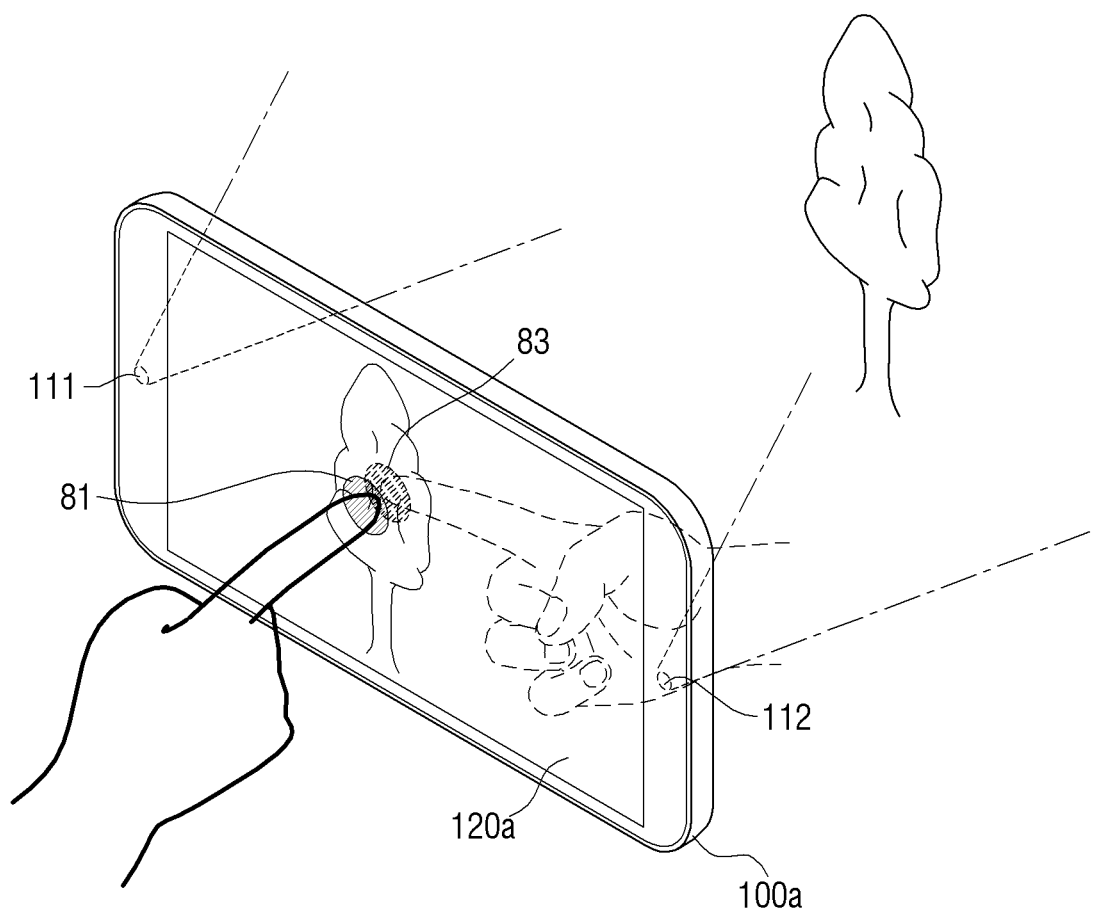
FIG. 15 is a view illustrating a method of controlling an imaging apparatus according to another exemplary embodiment of the present general inventive concept.

FIG. 15 is a view explaining a method of controlling an imaging apparatus 100a according to another exemplary embodiment of the present general inventive concept.

Referring to FIG. 15, two cameras 111 and 112 image a subject. The imaged subject is displayed in the transparent display 120a. The transparent display 120a may display the imaged images as a single 3D-applied image. Alternatively, the transparent display 120a may be divided into two regions, and a subject imaged in the first camera 111 is displayed in one region, and a subject imaged in the second camera 112 is displayed in the other region.

The above-described imaging apparatus 100a may set that the one imaging-related menu corresponds to a touch gesture 81 of the front side of the transparent display 120a and the other imaging-related menu corresponds to a touch gesture 83 of the rear side. In FIG. 15, the touch gesture 81 with respect to the front side of the transparent display 120a corresponds to a parallax adjustment mode, and the touch gesture 83 with respect to the rear side corresponds to a focus adjustment mode. As described above, the modes corresponding to the front side and the rear side are not unconditional, and switching of a recognition surface of the transparent display 120 according to selection of the flip button 192-1a is possible.

The imaging apparatus 100a may display a separate imaging button (not illustrated) on the transparent display 120a. The user may adjust the parallax by performing a touch gesture with respect to the front side of the transparent display 120, adjust a focus by performing a touch with respect to the rear side in real time, and image the subject by directly selecting an imaging button. Therefore, the user may set two imaging factors, for example, the parallax and focus, in real time, and directly perform imaging to obtain an optimal image.

Figure 16:
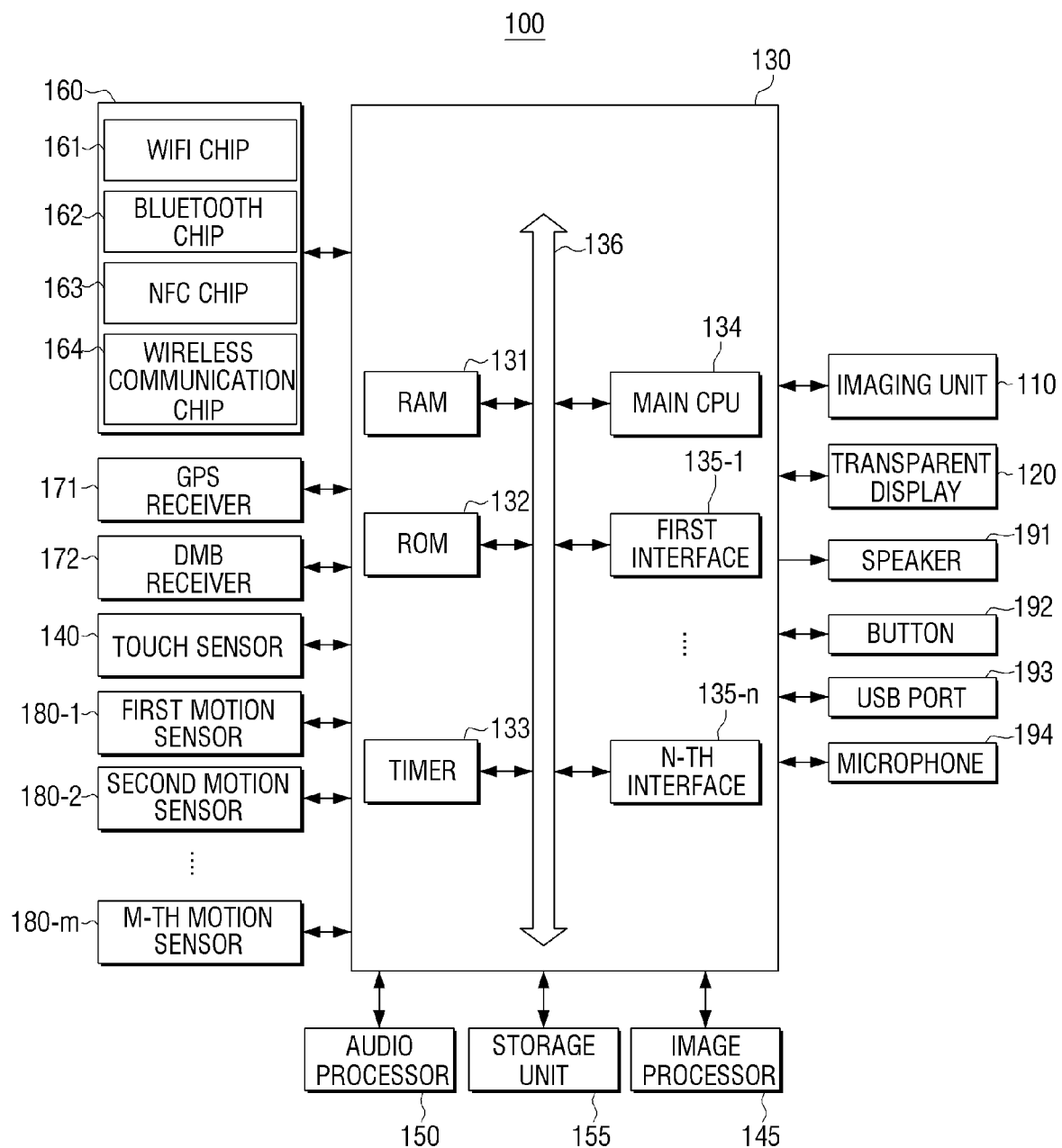
FIG. 16 is a view explaining various components which may be provided in an imaging apparatus according to an exemplary embodiment of the present general inventive concept.

FIG. 16 is a view explaining various components which may be provided in an imaging apparatus 100 according to an exemplary embodiment of the present general inventive concept. Referring to FIG. 16, the imaging apparatus 100 includes an imaging unit 110, a transparent display 120, a controller 130, a touch sensor 140, an image processor 145, an audio processor 150, a storage unit 155, a communication unit 160, a global positioning system (GPS) receiver 171, a digital multimedia broadcasting (DMB) receiver 172, first to m-th motion sensors 180-1 to 180-m, a speaker 191, a button 192, a universal serial bus (USB) port 193, and a microphone 194.

The imaging unit 110 images a subject. The imaging unit 110 may include a plurality of cameras, as illustrated for example in FIG. 14. The transparent display 120 includes at least one transparent display layer (not illustrated), and the transparent display layer is controlled by the controller 130 to display a screen. A plurality of transparent display layers may be provided. The imaging unit 110 and the transparent display 120 have been described in detail in the above-described exemplary embodiments of the present general inventive concept, and thus detailed description thereof will be omitted.

The touch sensor 140 may be disposed in at least one of the transparent display layers to sense a touch operation of the user. That is, the touch sensor 140 may be disposed only in the uppermost transparent display layer, or a plurality of touch sensors 140 may be disposed in uppermost and lowermost transparent display layers.

The plurality of motion sensors 180-1 to 180-m are sensors configured to sense a rotation state of the imaging apparatus 100, a location of the user, and the like. As the sensor configured to sense the rotation state of the imaging apparatus 100, a geomagnetic sensor (not illustrated), an acceleration sensor (not illustrated), a gyro sensor (not illustrated), and the like may be used. The acceleration sensor outputs a sensing value corresponding to gravitational acceleration changed according to a slope of an apparatus to which the acceleration sensor is attached. The gyro sensor is a sensor configured to detect angular velocity by measuring the Coriolis force applied to a velocity direction when a rotational motion occurs. The geomagnetic sensor is configured to sense an azimuth. As the sensor configured to sense the location of the user, there are an infrared sensor (not illustrated), a photodiode (not illustrated), and the like.

The controller 130 may control the image processor 145 according to sensing results sensed through the touch sensor 140 and the plurality of motion sensors 180-1 to 180-m, an operation state of the button 192, a motion gesture of the user acquired using an imaging unit 110, and a voice command acquired using the microphone 194 to display various screens on the transparent display layers.

Further, the controller 130 may control the components of the imaging apparatus 100 using a program and data stored in the storage unit 155.

For example, the controller 130 may perform communication with external apparatuses through the communication unit 160.

The communication unit 160 may be configured to perform communication with various types of external apparatuses according to various types of communication methods. The communication unit 160 includes various communication chips such as a wireless fidelity (WIFI) chip 161, a Bluetooth chip 162, a near field communication (NFC) chip 163, and a wireless communication chip 164.

The WIFI chip 161, the Bluetooth chip 162, and the NFC chip 163 perform communication in a WIFI manner, a Bluetooth manner, and an NFC manner, respectively. Among the communication chips, the NFC chip 163 is a chip configured to operate in an NFC manner using a band of 13.56 MHz among various radio frequency identification (RF-ID) frequency bands such as 135 kHz, 13.56 MHz, 433 MHz, 860 to 960 MHz, and 2.45 GHz. When the WIFI chip 161 or the Bluetooth chip 162 is used, the communication unit 160 may first transmit/receive a variety of connection information such as a service set identifier (SSID) and a session key, connect communication using the information, and transmit/receive a variety of information. The wireless communication chip 164 is a chip configured to perform communication according to various communication standards, such as Institute of Electrical and Electronics Engineers (IEEE), Zigbee, 3rd generation (3G), 3rd Generation Partnership Project (3GPP), or Long Term Evolution (LTE). The controller 130 may display data received from the external apparatuses through the communication unit 160 in the transparent display layer.

The GPS receiver 171 is configured to receive a GPS signal from a GPS satellite, and calculate a current location of the imaging apparatus 100. When a navigation function is executed, the controller 130 may calculate the current location using the GPS signal received through the GPS receiver 171, and display a path guidance screen, to which the current location is reflected, to the transparent display layer.

The DMB receiver 172 is configured to receive and process a DMB signal. When a DMB function is executed, the controller 130 may display the DMB reception screen to the transparent display layer. When the plurality of transparent display layers are implemented, the controller 130 may receive a caption-added DMB signal, separate the caption from the DMB signal, and display the caption and an image frame to different transparent display layers. For example, the image layer may be displayed in a lower transparent display layer, and the caption may be displayed in an upper transparent display layer. Therefore, the user may recognize the caption more three-dimensionally.

The image processor 145 functions to form a screen displayed on the transparent display layer as described above. The image processor 145 may further include various components, such as a codec (not illustrated) configured to perform encoding or decoding on video data, a parser (not illustrated), a scaler (not illustrated), a noise filter (not illustrated), and a frame rate conversion module (not illustrated).

The audio processor 150 is configured to perform processing on audio data. The audio processor 150 may variously perform processing on the audio data, such as decoding, amplification, and noise filtering for the audio data. When content including an audio signal is reproduced, the controller 130 may control the audio processor 150 to output the audio signal while displaying a reproducing screen in one of the plurality of transparent display layers. The audio signal is provided to the speaker 191 to be output.

The speaker 191 is configured to output various alarm sounds or voice messages as well as a variety of audio data processed in the audio processor 150.

The button 192 may include various types of buttons, such as a mechanical button, a touch pad, or a wheel, which are provided in arbitrary regions of an external appearance of a main body of the imaging apparatus 100, such as a front side, a lateral side, or a rear side. As described above, a flip button 192-1 configured to change a touch sensing direction may be implemented with a physical key.

The USB port 193 may perform communication with various external apparatuses through a USB cable. The microphone 194 is configured to receive a user's voice or another sound, and convert the received user's voice or the sound into audio data.

The controller 130 may use the user's voice input through the microphone 194 during a call or may convert the user's voice into audio data, and store the audio data in the storage unit 155.

When the imaging unit 110 and the microphone 194 are provided, the controller 130 may perform a control operation according to the user's voice input through the microphone 194 or the user motion recognized by the imaging unit 110. That is, the imaging apparatus 100 may operate in a motion control mode or a voice control mode other than a general mode controlled by a touch or a button operation of the user. When the imaging apparatus 100 operates in the motion control mode, the controller 130 activates the imaging unit 110 to image the user, traces change in motion corresponding to a gesture of the user, and performs a control operation corresponding to the gesture. When the imaging apparatus 100 operates in the voice control mode, the controller 130 analyzes a user's voice input through the microphone 194, and operates in the voice recognition mode which performs a control operation according to the analyzed user's voice.

In addition, the imaging apparatus 100 may further include various external input ports to connect to various external terminals, such as a headset, a mouse, and a local area network (LAN).

The operation of the above-described controller 130 may be performed by the program stored in the storage unit 155. The storage unit 155 may store an operating system (O/S) software to drive the imaging apparatus 100, a variety of applications, a variety of data input or set during application execution, content, a touch gesture, a motion gesture, a voice command, event information.

The controller 130 controls an overall operation of the imaging apparatus 100 using various programs stored in the storage unit 155.

The controller 130 includes a random access memory (RAM) 131, a read only memory (ROM) 132, a timer 133, a main central processing unit (CPU) 134, first to n-th interfaces 135-1 to 135-n, and a bus 136. The RAM 131, the ROM 132, the timer 133, the main CPU 134, the first to n-th interfaces 135-1 to 135-n, and the like may be electrically connected to each other through the bus 136.

The first to n-th interfaces 135-1 to 135-n are coupled to the above-described components. One of the interfaces may be a network interface coupled to an external apparatus through a network.

The main CPU 134 accesses the storage unit 155 to perform booting using an O/S stored in the storage unit 155. The main CPU 134 performs various operations using various programs, content, data, and the like stored in the storage unit 155.

A command set, and the like for system booting is stored in the ROM 132. When a turn-on command is input to supply power, the main CPU 134 copies the O/S stored in the storage unit 155 to the RAM 131 according to a command stored in the ROM 132, and executes the O/S to boot a system. When the booting is completed, the main CPU 134 copies various application programs stored in the storage unit 155 to the RAM 131, and executes the application programs copied to the RAM 131 to perform various operations.

When various types of user operations are sensed through the touch sensor 140, the plurality of motion sensors 180-1 to 180-m, the button 192, the microphone 194, and the like, the main CPU 134 determines whether or not the sensing result corresponds to an event matching event information stored in the storage unit 155. The main CPU 134 may determine whether or not the event is corresponds to a sensing result sensed by the timer 133 or other components. As described above, the event may be variously set. For example, there is an event in which a user touch or button selection is made, an event in which a motion gesture, a voice command, and the like is input, an event in which an application execution command is input, an event in which a content reproduction command is input, an event in which a preset time arrives or a preset time period passes, an event in which a system alarm message is generated, an event in which communication is performed with an external source, and the like.

When it is determined that the sensing result corresponds to an event, the main CPU 134 loads a program corresponding to the event to the RAM 131 from the storage unit 155, and executes the program. The main CPU 134 drives the image processor 145 according to the execution of the program to display a screen corresponding to the event.

The main CPU 134 determines a transparent display layer in which a second screen is to be displayed when an event to display the other screen occurs. Specifically, the CPU determines a second transparent display layer to display the second screen while a first screen is displayed in a first transparent display layer. At this time, the main CPU may determine the transparent display layer by considering the relationship between the first screen and the second screen, user setting information, a screen size, and the like. That is, when the first screen and the second screen display information of the same level, the first screen and the second screen may be displayed in the same transparent display layer. For example, when the user inputs a command to execute a web browser again in a state in which the first screen is a web browsing screen, the second screen may be implemented as a web browsing screen and displayed on the same first transparent display layer as the first screen. On the other hand, when the user selects some subjects in the first screen in a state in which the first screen is a web browsing screen, the second screen may be a web browsing screen provided from a source linked to the selected subjects, and be displayed in a different transparent display layer than the first screen. Furthermore, displaying the second screen may also change the transparent display layer that the first screen is displayed on. For example, when the first screen is initially displayed in an upper transparent display layer, the first screen may move to the lower transparent display layer, and the second screen may be displayed in the same upper transparent layer that the first screen initially was displayed in, or a new upper transparent display layer.

The main CPU 134 may determine a transparent display layer of the second screen, as well as a size, a display location, or the like of the second screen according to a user setting state. That is, when the user sets such that the second screen does not overlap the first screen, the main CPU 134 may determine to display the second screen in another location other than the first screen display location, and control the size and shape of the second screen so as not to overlap the first screen.

As described above, the display layers or display locations of the screens, and other display attributes may be determined by the controller 130.

In addition, when rotation of the imaging apparatus 100 is sensed in at least one of the motion sensors 180-1 to 180-$m$, or the user touch is sensed by the touch sensor 140, the main CPU 134 may convert display layers of the screens or change the display locations and the other display attributes, according to the rotation or the touch. The operations have been described in detail in the above-described exemplary embodiments of the present general inventive concept, and thus repeated description thereof will be omitted.

The main CPU 134 may control the timer 133 to count time. Therefore, the main CPU may count how long the touch state of the user is maintained, and adjust a screen display layer or other display attribute according to a determination result. Further, the main CPU may also determine whether or not an event is generated according to a counting result of the timer 133.

FIG. 16 illustrates integrally components by exemplifying a case in which the imaging apparatus 100 is an apparatus including various functions such as a communication function, a broadcast reception function, a moving image reproduction function, and a display function. Therefore, in some exemplary embodiments of the present general inventive concept, portions of the components illustrated in FIG. 16 may be omitted and modified, or other components may be added.

Figure 17:
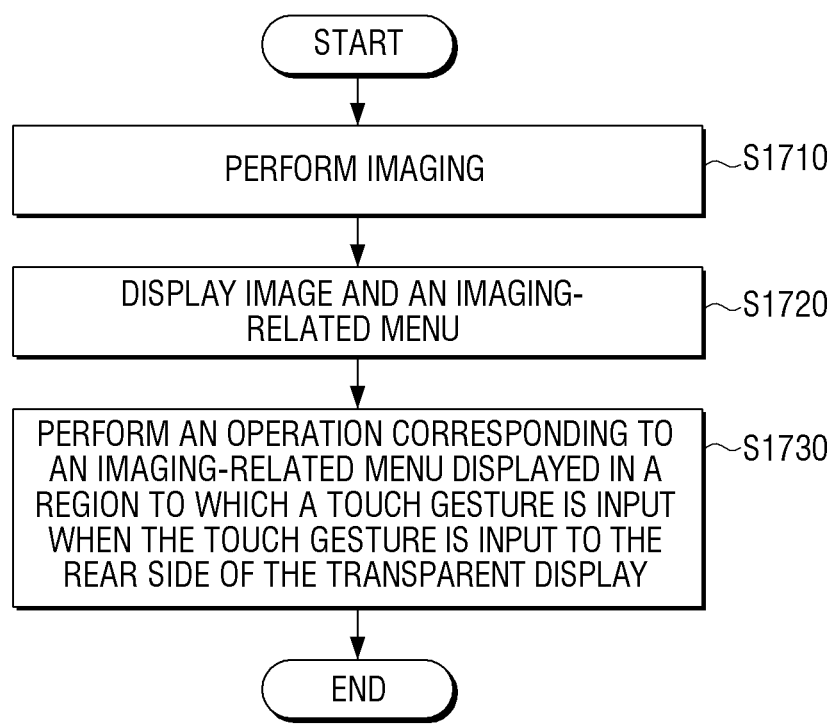
FIG. 17 is a flowchart illustrating a method of controlling an imaging apparatus according to an exemplary embodiment of the present general inventive concept.

FIG. 17 is a flowchart illustrating a method of controlling an imaging apparatus 100 according to another exemplary embodiment of the present general inventive concept.

Referring to FIG. 17, the imaging apparatus performs an imaging using an imaging unit (S1710). The imaging apparatus displays an image generated by the imaging unit and an imaging-related menu (S1720). The generated image includes a preview image. The imaging-related menu may be displayed in a table form or an icon form and menus corresponding to a front side and a rear side of a transparent display may be display in the same region. The imaging-related menu may be displayed in a cylindrical shape. A command corresponding to the front side and the rear side of the transparent display is one, the imaging apparatus may not perform a specific display, and perform a command corresponding to a touch gesture when the touch gesture with respect to the front side and the rear side is recognized.

When the touch gesture with respect to the rear side of the transparent display 120 is input, the imaging apparatus 100 performs an operation corresponding to an imaging-related menu displayed in a region to which the touch gesture is input (operation S1730). For the purposes of this exemplary embodiment of the present general inventive concept, the front side of the transparent display 120 may be referred to a side in the direction of a user, and the rear side thereof may be referred to as a side in the direction of a subject. However, the front side and the rear side may be defined for convenience of description, and thus is not limited thereto.

The imaging apparatus 100 may include a physical external key or a soft key type flip button on the transparent display 120, and may switch a surface of the transparent display 120 in which the menu is recognized when the flip button is selected.

The control method of the imaging apparatus 100 according to the above-described various exemplary embodiments of the present general inventive concept may be implemented in a program to be provided to the imaging apparatus 100.

For example, a non-transitory computer-recordable medium may be provided, containing a program to execute performing imaging on a subject using an imaging unit, displaying an image generated by an imaging unit and an imaging-related menu, and performing an operation corresponding to an imaging-related menu displayed in a region to which a touch gesture is input when the touch gesture with a rear side of a transparent display is input is stored, may be provided.

The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the above-described various exemplary embodiments, the user may perform imaging environment setting and imaging conveniently, and the user perform imaging in an optimal state.

The present general inventive concept allows the user to control an imaging operation by inputting control commands to either a front side or a back side of a transparent display. By inputting commands to a back side of the display, the user may control the imaging operation without obscuring the screen with their hand. Furthermore, since commands may be input on either side of the display, this allows multiple inputs to be used to control the display. For example, the user may touch an imaging-related menu on the back side of the transparent display while performing a touch gesture on the front side of the display, in order to manipulate a displayed image.

It will be understood that the present general inventive concept is not limited to the exemplary embodiments described above and illustrated in the Figures. For example, although the exemplary embodiments illustrated in the Figures are of portable devices which may be held in a user's hand, stand-alone apparatuses, for example televisions or PC monitors, may also implement the present general inventive concept, if they include a transparent display and an imaging unit.

The present general inventive concept is also not limited only to single-user situations. Since commands can be input to both the first and second sides of the transparent display, two users disposed on either side of the apparatus could make use of the same apparatus at once. This would allow two users to collaborate on an application displayed on the transparent display. For example, two users could simultaneously view and manipulate an image displayed on the transparent display. Furthermore, if an imaging unit were disposed on either side of the imaging apparatus, two users could each participate in a video call to a third party.

Furthermore, although the exemplary embodiments described above illustrate one or more cameras disposed on only one side of the imaging apparatus, one or more imaging units may be disposed on opposite sides of the imaging apparatus. This would increase user convenience in performing self-imaging, since an imaging unit would be present on both the user and the subject side of the apparatus. Furthermore, an imaging unit on either side of the imaging apparatus would allow multiple users to input commands via gestures recognized through the imaging units.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An imaging apparatus comprising:
   an imaging unit to image an object;
      a transparent display to display a live-view of the imaging unit and an imaging-related menu in a direction of a user;
      a sensor to sense a touch with respect to two sides of the transparent display;
      a controller to perform an operation corresponding to the imaging-related menu, when the imaging-related menu is selected by a touch input on a side of the transparent display corresponding to a direction of the object; and
      a flip button to change a touch sensing direction,
      wherein when the flip button is selected, the controller controls the sensor to toggle which of the two sides of the transparent display receives the touch input,
      wherein the controller displays a pre-stored image when a reproduction mode is selected, sequentially changes and displays the pre-stored image in image units when the side of the transparent display in the direction of the user is touched, and sequentially changes and displays the pre-stored image in preset image unit groups when the side of the transparent display in the direction of the object is touched.

2. The imaging apparatus of claim 1, wherein the flip button is at least one of a physical external button and a soft key displayed in any one side of the transparent display.

3. The imaging apparatus of claim 1, wherein:
   the imaging-related menu comprises:
   an imaging button which is selected with the touch input on the side of the transparent display in the direction of the object; and
   the controller performs imaging on the object to obtain an image of the object and stores the imaged image in a storage unit when the imaging button is selected.

4. The imaging apparatus of claim 1, wherein:
   the imaging-related menu comprises:
      a first menu selected by a touch gesture with respect to a first side of the two sides of the transparent display; and
      a second menu selected by a touch gesture with respect to a second side of the two sides of the transparent display.

5. The imaging apparatus of claim 4, wherein:
   the first menu comprises at least one of a focus adjustment button and a special effect setting button; and
   the second menu comprises an imaging button.

6. The imaging apparatus of claim 4, wherein:
   the imaging unit comprises two cameras disposed on a same side of the imaging apparatus and configured to image a three-dimensional (3D) image;
   the first menu comprises a parallax adjustment button; and
   the second menu comprises a focus adjustment button.

7. The imaging apparatus of claim 1, wherein:
   the imaging-related menu has a cylindrical shape, and is displayed in a rotating form; and the controller rotates the imaging-related menu in a first direction when the side of the transparent display in the direction of the user is touched, and rotates the imaging-related menu in a second direction when the side of the transparent display in the direction of the object is touched.

8. A method of controlling an imaging apparatus including a transparent display, the method comprising:
   performing imaging on an object;
   displaying a live-view and an imaging-related menu in a direction of a user;
   sensing a touch with respect to two sides of the transparent display;
   performing an operation corresponding to the imaging-related menu when the imaging-related menu is selected by a touch input on a side of the transparent display corresponding to a direction of the object;
   when a flip button is selected, toggling which of the two sides of the transparent display receives the touch input, and
   displaying a pre-stored image when a reproduction mode is selected, sequentially changing and displaying the pre-stored image in image units when the side of the transparent display in the direction of the user is touched, and sequentially changing and displaying the pre-stored image in preset image unit groups when the side of the transparent display in the direction of the object is touched.

9. The method of claim 8, wherein:
   the performing of the operation corresponding to the imaging-related menu comprises:
   performing imaging on the object to obtain an image of the object and storing the imaged image, when an imaging button is selected with the touch input on the side of the transparent display in the direction of the object.

10. The method of claim 8, wherein:
    the imaging-related menu comprises:
    a first menu selected by a touch gesture with respect to a first side of the transparent display; and a second menu selected by a touch gesture with respect to a second side of the transparent display.

11. The method of claim 10, wherein:
the first menu comprises at least one of a focus adjustment button and a special effect setting button; and
the second menu comprises an imaging button.

12. The method of claim 10, wherein: the performing of the imaging comprises performing imaging using two cameras configured to image a 3D image;
the first menu comprises a parallax adjustment button; and
the second menu comprises a focus adjustment button.

13. The method of claim 8, wherein:
the imaging-related menu has a cylindrical shape, and is displayed in a rotating form; and
the performing of an operation corresponding to the imaging-related menu comprises:
rotating the imaging-related menu in a first direction when the side of the transparent display in the direction of the user is touched; and
rotating the imaging-related menu in a second direction when the side of the transparent display in the direction of the object is touched.

14. A non-transitory computer-readable recording medium to contain computer-readable codes as one or more programs to execute the method of claim 8.

* * * * *